(12) United States Patent
Eichenauer

(10) Patent No.: US 8,381,432 B2
(45) Date of Patent: Feb. 26, 2013

(54) VEGETATION AND SUPPORT LAYER, AND METHOD FOR THE PRODUCTION THEREOF

(76) Inventor: Thomas Eichenauer, Linz (AT)

( * ) Notice: Subject to any disclaimer, the term of this patent is extended or adjusted under 35 U.S.C. 154(b) by 0 days.

(21) Appl. No.: 13/060,787

(22) PCT Filed: Aug. 24, 2009

(86) PCT No.: PCT/AT2009/000325
§ 371 (c)(1),
(2), (4) Date: Feb. 25, 2011

(87) PCT Pub. No.: WO2010/022421
PCT Pub. Date: Mar. 4, 2010

(65) Prior Publication Data
US 2011/0154734 A1 Jun. 30, 2011

(30) Foreign Application Priority Data
Aug. 26, 2008 (AT) ................. A 1317/2008

(51) Int. Cl.
*A01C 1/04* (2006.01)
(52) U.S. Cl. ............. 47/1.01 F; 47/81; 47/48.5
(58) Field of Classification Search ........... 47/1.01 R, 47/1.01 F, 59 S, 81, 48.5, 56, 20.1, 21.1, 47/32
See application file for complete search history.

(56) References Cited

U.S. PATENT DOCUMENTS
5,224,292 A * 7/1993 Anton .................. 47/64
2007/0186467 A1* 8/2007 Ramsey et al. ........... 47/59 S
2011/0083363 A1* 4/2011 Trias Vila et al. ....... 47/58.1 SC FOREIGN PATENT DOCUMENTS
| DE | 2729405 A1 | 4/1978 |
| DE | 3627507 A1 | 2/1988 |
| JP | 10215687 A | 8/1998 |
| NL | 7600654 A | 7/1977 |
| WO | 98/32323 A | 7/1998 |
| WO | 2007/142497 A | 12/2007 |

* cited by examiner

Primary Examiner — Rob Swiatek
Assistant Examiner — Lisa Tsang
(74) Attorney, Agent, or Firm — David A. Guerra

(57) ABSTRACT

A vegetation and support layer comprising a mixture of natural soil materials and wicks. The wicks are made of a water-conducting and air-conducting material in the form of an elongate intertwined structure such that the wicks distribute water and air within the vegetation and support layer. The wicks in the vegetation and support layer according to the invention are randomly mixed with the soil material, are arranged similar to a net, or are introduced from above. The wicks are arranged at a distance from a lower receptacle that is filled with water or from a groundwater conductor such that the wicks do not reach lower layers of water.

18 Claims, 3 Drawing Sheets

VEGETATION AND SUPPORT LAYER, AND METHOD FOR THE PRODUCTION THEREOF

CROSS-REFERENCE TO RELATED APPLICATIONS

This application is an U.S. national phase application under 35 U.S.C. §371 based upon co-pending International Application No. PCT/AT2009/000325 filed on Aug. 24, 2009. Additionally, this U.S. national phase application claims the benefit of priority of co-pending International Application No. PCT/AT2009/000325 filed on Aug. 24, 2009, and Austria Application No. A 1317/2008 filed on Aug. 26, 2008. The entire disclosures of the prior applications are incorporated herein by reference. The international application was published on Mar. 4, 2010 under Publication No. WO2010/022421.

BACKGROUND OF THE INVENTION

1. Field of the Invention

The invention relates to a vegetation and support layer for providing in a soil layer an improved water and air distribution and a water consumption regulating effect. The invention further relates to the production of the vegetation and support layer.

2. Description of the Prior Art

Vegetation and support layers are known in various embodiments in which connection, by way of example, reference may be made to EP 0 204 381 B1 and GB 2 393 889 A.

A vegetation and support layer is also known from DE 20 2007 009371 U. The known vegetation and support layers which are intended for natural sports greens have admixed thereto synthetic lawn fibres and lava sand. The admixed individual fibres serve for stabilising the root region and are intended to stabilise the root region and to provide the plant roots with an anchoring means in order to increase the load-bearing capacity. The fibres admixed in the case of DE 20 2007 009371 are individual fibres and have no water or air distributing effect.

The vegetation and support layer according to GB 2 393 889 A is predominantly designed as an irrigation means for plants, in particular potted plants, wherein, by means of soil wicks, water is to be conducted from a supply of water at ground level to the roots.

EP 0 204 381 B1 relates to a vegetation and support layer, and relates to a means for a sports ground which is to be provided on a foundation and which is to consist of a layer of natural sand, the sports field having admixed thereto fibrous particles on which a turf of artificial grass is to be provided. Moreover, with the sports field according to EP 0 204 381 B1, it is provided that the fibrous particles are to be elastomeric chips or fibres and that the sand admixed to the layer is to be composed at least in part of hydraulic slag. The fibrous particles used for the sports field of EP 0 204 381 B1 have no water- or air distributing or storing effect whatsoever, since they are chips or fibres of elastomeric material.

The invention, starting from a vegetation and support layer having the features based on the object to propose a vegetation and support layer which provides in the soil layer an improved water and air distribution and provides a water consumption regulating effect.

SUMMARY OF THE INVENTION

According to the invention, this object is attained by means of a vegetation and support layer which includes a mixture of natural soil material and soil wicks in the form of an elongate filament braiding or textile strips, characterized in that the soil wicks for the distribution of water and air are composed of a material which conducts both water as well as air, that the soil wicks are randomly mixed in the soil material, arranged in net-like manner or are introduced form above, that the soil wicks are arranged at a distance from a lower lying water-filled vessel or a ground water-bearing formation and that the mixture of soil wicks and soil material optionally contains further additives and soil improvement agents.

Preferred and advantageous embodiments of the invention form the subject of subsidiary claims.

Due to the design of the vegetation and support layer, this layer, as compared with known vegetation and support layers, has improved properties for distributing water and air in the soil layer. Moreover, the vegetation and support layer according to the invention has a regulatory effect on water management since, in the event of soil being too dry, it acts as water storage and when soils are too wet or impervious, it has a water-draining effect.

The soil wicks to be used within the scope of the invention are air- and water pervious elongate or string-shaped fibre braidings. Such fibre braidings may be cotton wicks as in the case of candles, glass fibres, mineral wool, coconut fibres or elongately cut geo textile strips. The filaments within the soil wicks may be parallel and/or randomly orientated. The soil wicks may, within the scope of the invention, be interconnected in annular or netlike fashion in order to increase the shearing strength of the vegetation and support layer according to the invention. The soil wicks to be used are to be so designed that they have a water pervious surface structure which prevents the total or partial influx of fine soil particles so that a core of the soil mix is available which can store and transport air and water.

Soil materials usable within the scope of the invention are mixtures of clay, silt, sand, gravel and rock fractions as well as biological materials such as branches, straw, root matter, peat, humus, coal, leaves and the like.

The vegetation and support layer according to the invention permits a large number of possible uses. The vegetation and support layer according to the invention may be employed for sports grounds (golf, football, horse riding grounds), embankments, ski pists, side roads, for gardening, landscaping, for plantations, on driveways and footpaths, picnic areas, parking areas, landing strips, lawn intermeshing paving stones, greened roofs, flower boxes, greening of deserts, road- and railway embankments, storage dams, landfills, vineyards, erosion protection, river embankment protection, effluent seepage ponds, vegetation for sewage treatment plant, for tree root aeration, funerals under rolled turf, at public event venues and the like.

The geo textiles to be used for the production of soil wicks in the vegetation and support layer according to the invention may be woven or non-woven fabrics, as are generally employed as filtration and separation devices, in which context weights per surface area of 100 to 250 gram/m$^2$ usually apply. Heavy non-wovens having weights per surface area of 400 to 2000 gram/m$^2$ are generally employed as protective layers, e.g. above sealing foils in a landfill context. The drainage capacity of relatively heavy non-wovens is usually under estimated.

For the soil wicks provided in accordance with the invention which are to be employed for distributing water and air, the drainage capacity of such non-wovens is perfectly adequate.

Within the scope of the invention, soil wicks having a glass fibre content are advantageous if the water or capillary conduction is paramount.

If, within the scope of the invention, a higher air permeability and water storage capacity is desired, soil wicks of geo textiles, e.g. mechanically reinforced non-wovens are advantageous.

Moreover, geo textiles (mostly of plastics, natural materials such as e.g. hemp, cotton or coconut fibre, glass fibres, rock wool), because of their great variety, may more readily be adapted to soil material conditions, e.g. in order to prevent blockage/clogging of the soil wick surface by fine components and in order thus to prevent a reduced water- and air permeability.

The soil wicks may, however, depending on the application, also be composed of combinations of glass fibres, plastics, natural materials etc.

Besides the lower air permeability, in the case of soil wicks of glass fibre multi filament strings, the capillary conductivity must also be taken into account.

If the soil wicks extend up to the soil surface, the glass fibre wicks may suck up water continuously from lower lying layers, to be evaporated at the surface. Accordingly, depending on the soil mixture, climate and purpose of use, it may be advantageous to use soil wicks of synthetic fibres having greater or lesser capillary conductivity.

The dividing, e.g. of non-wovens or their combinations with further materials e.g. textiles, in order to produce soil wicks, may be performed by means of cutting rollers, knives, water jets, band saws or the like. In this context, the non-woven fabric, depending on the manner of cutting, may be unrolled (optionally in multiple layers) or the roll of non-woven fabric itself may be comminuted. One of the advantages of the non-woven strips is their low-cost manufacture. Furthermore, due to the multiplicity of the commercially available geo textiles, foils etc., the material properties can be optimally adapted to soil and purposes of use. For instance, the soil wicks of non-woven strips may be adapted to be more hydrophilic or more hydrophobic. If active pump actions of the non-woven strips are desired under changing load conditions for increased water and/or air conveyance, a soft needle-bonded web may for example be used. If a more rigid variety appears to be needed, an additionally thermally reinforced or resin-treated non-woven may be cut. It is furthermore possible to elect optimally the drainage capacity, the flexibility, the pore aperture width, the fibre density and diameter, roughness or smoothness of the fibre surface, capillarity, tensile strength etc. A further advantage of non-woven strips (but also e.g. strips of multi filament woven fabrics etc) as compared with round embodiments, results from the use of very flat strips. Thus, for example, an embodiment with the dimensions of 3×27 mm of a given volume provides about twice the surface area as a soil wick of the same length having a 10 mm diameter. As a result, the contact and filter interface with the soil is doubled, resulting in a more rapid air and water exchange and the friction as well as the positively influenced soil volume is increased.

Before cutting the strips, the geo textiles may be interconnected in tubular manner. Cross cutting results in geo textile rings which, when mixed into the soil, result in clearly increased shearing and load bearing capacity. This may also be increased by relatively small longitudinal cuts in the wicks of non-woven material or by rough lateral cuts, with anchoring cross arms etc.

The soil wicks may also be interconnected at node points to form net structures. This may be brought about in numerous manners. For example, elongate soil wicks may be knotted together like fishing- or other nets. Prior or after tiering superimposed groups of strips angularly displaced by 90° in relation to one another, may be interconnected at the node localities by adhesive, welding or heat melting adhesive action, etc.

Geo textiles or geo textiles combined with further materials and being of large surface area may be intersected (in the manner of a shopping bag net) in such a way that the surface area is rendered expandable in one or two directions and a soil wick net structure is formed. Such nets may be intermixed with the soil material in a single plane or three-dimensionally. For example, the net can be laid out on the soil or on a geo textile in a relaxed state, be covered with a loose layer of soil and then be lifted upwards by means of hooks passed through the soil layer at multiple points, or even be lifted above the soil layer. Subsequently, this mixture may be compacted. Besides the simple manner of installation, an advantage of the soil wick nets resides in an even better air and water distribution and a reinforcement of the mixture over large surface areas. Soil wick net structures may also be combined with further individual soil wicks.

In order to reduce erosion in the case of embankments, networks of soil wicks may also be laid out on the ground and be pressed or beaten point-wise down to lower levels. This may also e.g. be performed by means of soil anchoring means or soil wicks bent in a U-shape and which remain in the ground and thereby provide a long term anchoring of the soil wick net structure. If required, a thin layer of soil or vegetation matter may be applied thereover. Due to the positioning of the soil wick net close to the surface, erosion is reduced not only purely by mechanical retention of the soil (as in prior art erosion protection nets), but also by irrigating or draining the soil, as the case may be, as well as by a promotion of root growth. In the event of broadly cut geo textile nets which are expanded by traction, the individual strips become twisted between the node points. This results in pockets by which the introduced soil is additionally protected against erosion. Soil wick nets may also be provided in approximately sack-shaped configurations, in order to retain root conglomerates or in order to form around root conglomerates an air- and water distributing net structure.

Soil wick net structures may also be employed in combination with intermixed or hammered in individual soil wicks.

Soil wicks or soil wick nets may also be combined with rigidity or hardness enhancing materials, such as e.g. flower wire, thick glass fibres, wire screens, small plastics tubes, cement, resin etc. For example, non-woven strips may be sewn together with a wire or be wound around the wire and the edges of the web may be welded together or be needled together with one another or between a layer of web and a fabric etc. The rigidised soil wicks can be interconnected to form a three dimensional net structure and the soil material may be introduced through the apertures. This results e.g. in an additional inhibition of erosion of embankments or embankment wash-aways.

It is furthermore possible, prior to cutting the strips from geo textile combinations of large surface areas, e.g. by needle-bonding of a plurality of web layers or of a needle web with further textiles, to produce stretched fibres or foils. Between and in the layers of web or textile, further additive substances may be needle-bonded in. Additive substances which may be used include e.g. seeds, charcoal, bentonite, sand, zeolithe, ion exchangers, active carbon, fertiliser, spores, algae, straw, small tubes, water-storing materials and any combinations of the aforegoing. As an alternative to the aforegoing, the previously cut textile strips may be bonded to the additive substances. It is also possible for deep-drawn textiles/foils to be combined with further materials. Depending on the purpose of use, numerous further variants, such as e.g. glass fibre webs surrounding a core of coarsely porous non-woven material, can be conceived.

The soil wicks may be randomly mixed into the soil- or humus layer, in which case such mixing may be performed up front and the complete mixture may be applied and compacted. However, the intermixing can also be performed in situ into an already applied or a present layer of soil material, e.g. by harrowing or by means of a motorised cultivator.

On the other hand, it is possible to insert the soil wicks from above into an existing soil layer. In that case, during inserting by piercing (drilling, screwing, etc.) a soil wick may be inserted simultaneously or first a hole is e.g. pierced and subsequently the soil wick is inserted into this hole. When doing so, it is also possible to subsequently introduce sand (and/or fertiliser, latent heat storage substances, charcoal, super absorbers etc.)

between the wall of the hole and the soil wick in order to increase the filter surface area. In contrast to prior art, verti drains (vertical holes filled with sand, e.g. 20 to 30 cm long), this water- and air drainage functions permanently in the layer according to the invention, roots are guided to lower levels and can become anchored rapidly and effectively, the soil experiences an increase in shearing strength and loads are better distributed. In addition, soil compaction, matting and water-logging is reduced.

Depending on the application purpose, such piercing may be performed vertically or at an incline. The soil wicks may project beyond the surface or terminate level with the surface or below the soil surface. The soil wicks may be inserted one by one or several simultaneously. The soil wicks may also be bent over like a staple and be inserted into two or more holes or may be multiply pierced into the soil in the form of a long strip or rope. The upper interconnection between the piercing holes may also be subsequently severed or be cut off, level with the surface. Long soil wicks can also be inserted into slot formations and be drawn up to the surface at individual points.

A further possibility is the introduction of the soil wicks simultaneously with soil conglomerates, in which case it is even possible to pass the soil wicks through the soil conglomerates.

When used in sports grounds construction (e.g. golf course) the intention is to reduce matting of the uppermost turf layer due to the air and water distributing effect. By the downward conduction of water, the roots can penetrate to deeper levels, this being supported by preferential structures along or in the soil wicks. In addition, the roots can become anchored in the soil wicks. Due to the water being drained more rapidly from the surface into the body of the soil and being stored there for longer durations, water logging and evaporation is reduced, the plants have water available over longer periods and the intervals for artificial irrigation are increased. In addition, due to the air drainage and optionally pre-fertilised soil wicks, an effect similar to that of rain worm passages is attained. However, with some additional advantages such as the increased stability by increasing the internal shearing angle and the load distribution, depending on the design, the sub-soil, as a result of the air drainage in spring, may be warmed up earlier and, accordingly, also be utilised earlier. An excessive compaction of the sub-soil is prevented by the soil wicks. In contrast to so-called super-absorbers which lose their function at the latest after a few years, the soil wicks of plastics, when adapted to the soil, can perform their functions in the long term. If desired, soil wicks or parts thereof can also be made of degradable materials.

When used for picnic grounds and park developments, the rooting and vegetation growth is promoted, the excess surface water is rapidly drained and, accordingly, the user quality is increased.

When used for the greening of roofs and for plant boxes, there is in addition attained a reduction of the required soil layer and thereby of the structural loading. In addition, the water and fertiliser consumption is reduced and the irrigation frequency is reduced.

When used in road or railway substrates, transversely rigid soil wicks are advantageous. In addition to their load distributing and shearing angle increasing effect, local pore water excess pressures caused by loading are reduced, because the water can rapidly enter from the soil pore structure into the soil wicks and be released from there once again. As a result, also during installation, the compaction of the layers by means of rollers, can be optimised and performed more quickly.

In the case of secondary roads, footpaths, landing strips and parking sites, it is advantageous to randomly admix soil wicks which are rigid in their transverse direction. Due to the admixing, the load bearing capacity and the load distribution is increased and the locally excessive pore water pressures which, otherwise, would result in soil collapse, is reduced. Excess water is rapidly drained from the surface. In the case of greened parking areas, the load bearing capacity is increased due to an increased root growth into lower layers and improved root structure.

In land fill construction along steep embankments, there is always the risk of slipping away of the soil layer above the surface sealing layer. This layer which, as a rule, has a thickness of up to one meter, must be drained very thoroughly, otherwise excess water will emerge at the base of the embankment and results in a collapse of the embankment. By the intermingling or piercing of the soil wicks, the surface water is rapidly drained into the soil layer and onwards into the drainage layer there below and can rapidly emerge over wide areas along the base of the embankment without soil collapse, even if the drainage layer should fail because of silting up, inadequate dimensioning or settling fracturing—as happens over and again. Erosion is reduced due to the rapid discharge of the surface water. In addition, a clearly apparent increase of the internal shear angle is observed due to improved vegetation growth and thereby an increase of the rooting structure. Those properties are also advantageous in dam construction.

When used for seepage ponds and -trenches as well as for vegetated sewege treatment plants, the specially finely porous soil wicks (optionally with supporting wire installed therein) inserted from above down to the root level, may optionally project well above the soil surface. As a result, even if the surface has silted up (as an additional effect) water can nevertheless be drained through the silt layer into the soil layer. Such an effect may also be attained in that an "endlessly long" non-woven soil wick is subjected to multiple piercing into the ground, and in doing so, between successive penetrations, the broad soil wick may be twisted such that it projects from the surface.

As an alternative to the use of especially finely pored soil wicks, it is also possible to employ coarsely pored soil wicks, parts of which are mantled (by foils or finely porous textiles) or the surface of the soil wick is partially sealed by e.g. resin, adhesive, fusion or similar. This results in a local reduction of the pore size (<0.06 mm) on the soil surface or even complete encapsulation. When used e.g. for drainage ponds, soil wicks may be hammered in such a manner that the sealed section of the soil wick ends up in the region of a silt layer (e.g. silting up above the outcropping soil). This prevents the fines from penetrating from this layer into the core of the soil wick, causing its blockage. However, in the core, these soil wicks have larger pores than the finely porous variation and are therefore able to transport water and air more easily and rapidly. This variation also permits in various forms of use to convey water or air without interaction specifically through such layers.

A further embodiment of soil wicks for increasing the drainage and storage properties is provided by the complete or partial jacketing of a coarsely porous soil wick core by means of a finely porous geo textile.

When used for soils of high fines content which, when drying, are inclined to crack, a mixing-in of a multitude of thin elongate finely fibrous soil wicks of high tensile strength (e.g. 2×2×250 mm) is advantageous. This causes keeping the soil dry for longer periods due to water storage. The soil wicks act additionally as tensile fibres, so that, as in the case of tensile reinforcement in concrete, the cracking pattern is rendered uniform and the cracking depth becomes reduced. Erosion is thereby reduced. Likewise, with such soils, the use of fine soil wick net structures is advantageous.

When used in establishing plantations (e.g. of vineyards, date trees), it is also possible for the soil wicks to be introduced, from the soil surface into or adjoining the root conglomerates even afterwards, simply by piercing in or by the introduction into previously drilled holes. Due to the soil wicks, water and air are rapidly conducted into or stored in those regions and yields and quality are thereby increased. The soil wicks may be combined with latent heat storage means for improved temperature control of the roots, or with fertiliser, charcoal, super absorbers etc.

Similar procedures as in tree aeration (FIG. 2) may also be employed for venting coffins by conducting the soil wicks from the soil surface down to the coffin, alternatively by using high tensile strength embodiments of the soil wicks for lowering the coffin. In that case, the long and wide soil wicks are combined with deodorant substances (e.g. active charcoal needle-bonded between a web and a fabric or between two webs; soil wicks soaked in or sprayed with odour-neutralisers) in order to be able to eliminate the gases formed in the coffin, when rising to the soil surface, whilst still inside the soil wick.

Within the scope of the invention, there also exists the possibility of treating the soil wicks used according to the invention in the vegetation- and support layer for improving their properties or for attaining additional properties by spraying or soaking. Such treatments may be performed with one or more of the following means: odour neutralizers, algae, micro organisms, charcoal, active carbon, bentonite, adhesives, resin, liquid synthetic resins, zeolithe, ion exchangers, fertilisers, fungi/spores, water storing materials, super absorbers, wetting agents, latent heat storage means, plant seeds, yeast, ad- and absorbing materials, copper or any combination of such means with one another or with liquids.

Within the scope of the invention it is also possible to introduce additives or soil improvement substances into the vegetation- and support layer in the region of soil wicks composed, for example, of a plurality of layers.

Such soil improvement substances may, for example, be bentonite, zeolithe, ion exchangers, peat, straw, super absorbers, wetting agents, active carbon, latent heat storage means, fertilisers, plant seeds, algae, yeast, bacteria, fungi/spores, wood, straw, plant residues, plastics, geo textiles, rubber granulates, synthetic lawn fibres, ceramic chips, porous stones, sand, expanded clay, seeds, charcoal, (optionally already inoculated with micro organisms), ad- and absorbing materials, odour neutralizers, copper, microorganisms, sand, tensile fibres, supporting wires, small tubes, water storing materials or combinations thereof.

In order to prevent the influx of fine particles into the soil wicks provided according to the invention, these may be enveloped at least in part in foils or finely porous materials. Alternatively, the possibility exists to lock the surfaces of soil wicks partly with adhesive resin, by welding, calendaring etc. in order to create locally only very small surface pores or none at all. Small surface pores may have diameters of less than 0.06 mm.

The soil wicks which, within the scope of the invention are provided in the vegetation- and support layer are, in preferred embodiments, provided in the form of water and air storage means as air- and water distributors, as root anchors and for accelerating the growth of roots and vegetation. They may furthermore increase the soil shearing strength and stability, provide load distribution, decrease cracking, serve for watering or de-watering and also counteract soil compaction, as well as the formation of vegetation matting and of water logging, as well as for reducing pore water excess pressure.

Of the uses of the vegetation and support layers according to the invention may be emphasised particularly their use for sports fields (foot ball, golf, tennis, horse riding ground facilities etc.), embankments, skiing pists, trails, subsidiary roads, landing strips, in gardening and landscaping, picnic grounds, parking areas, lawn interlocking pavings, greening of roofs, flower boxes, greening of deserts, date plantations, re-forestations, dune stabilisation, road- and railway embankments, storage dams, land fills, grave greening, coffin ventilation, erosion protection, effluent seepage ponds and -trenches, vegetated sewage treatment plants, furrows, lawn modules, agronomy, vineyards, rolled turf, turf support layer.

Further additives and soil improvement auxiliaries may be contained in the vegetation and support layer according to the invention. These are, for example, bentonite, zeolithe, ion exchangers, peat, straw, super absorbers, charcoal and active carbon, latent heat storage means, fertilizers, plant seeds, algae, yeast, bacteria, fungi/spores, wood, straw, plant residues, plastics, geo textiles, rubber granulates, synthetic lawn fibres, ceramic chips, porous stones, sand, expanded clay.

In principle, the soil wicks provided in the vegetation and support layer according to the invention may, inter alia, consist of glass fibres, mineral fibres, cotton fibres, coconut fibres, hemp fibres, mineral fibres or textile strips.

BRIEF DESCRIPTION OF THE DRAWINGS

Further details and features of the invention will be apparent from the following description with reference to the drawings.

There is shown in.

DESCRIPTION OF THE PREFERRED EMBODIMENT

Figure 1:
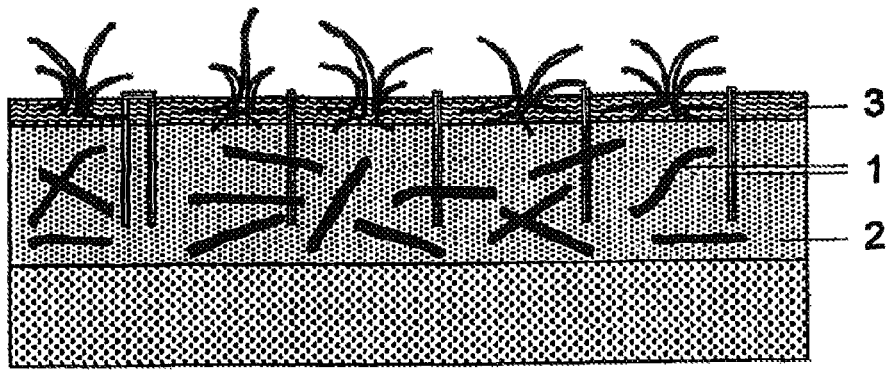
FIG. 1 an application example of a vegetation- and support layer according to the invention for rolled turf, FIG. 2 diagrammatically the application for aerating the roots of trees, and FIG. 3 an application example using a non-woven fabric combination.

In FIG. 1 there is shown how, under a rolled turf 3 still to be installed, for a sports ground, a substrate 2 of soil material, fertiliser and soil wicks 1 in the form of strips of non-woven fabric, randomly admixed, is applied 30 cm thick and compacted. The soil wicks 1 consist e.g. of non-woven strips cut to 6×8×250 mm size. The basic non-woven web was a needled web of polypropylene having pore aperture width= 0.09 mm and a surface area mass of 600 g/m$^2$. Liquid fertiliser was sprayed onto the needled web prior to cutting.

In addition, it is possible to insert, by piercing from above (before or after the rolled turf 3 has been laid out) soil wicks into the applied substrate 2 in the form of strips of non-woven fabric. In this use embodiment the soil wicks 1 do not only perform a water- and air distributing function, but also offer preferred passages to the roots from the rolled turf 3, so that these may rapidly and deeply grow into [the substrate] and become anchored therein. Furthermore, the soil wicks 1, depending on the nature of the sports ground, the soil material and climate, can be laid out in a resilient, load distributing etc. manner.

For rapid fixing of the rolled turf 3 on the substrate 2, the soil wicks 1 may also be pierced in, bent in U-shaped fashion like staples or as a long strip in multiple fashion through the rolled turf 3. For this purpose, a high tensile strength embodiment of the soil wick 1 (e.g. a web combination with woven fabric, stretched filaments between two layers of webs, fibre glass wicks) is advantageous. The rolled turf 3 can be played on sooner and can also be laid out on inclined surfaces. Too high a compaction of the soil is prevented in the long term.

It is also possible to employ a variety of soil wicks 1. For example, the soil wicks 1 which are inter-mixed, may be composed of 1 mm×200 mm glass fibre multi filament strings and the soil wicks 1 introduced from above of 4 mm×150 mm cut plastics fibre web.

Figure 2:
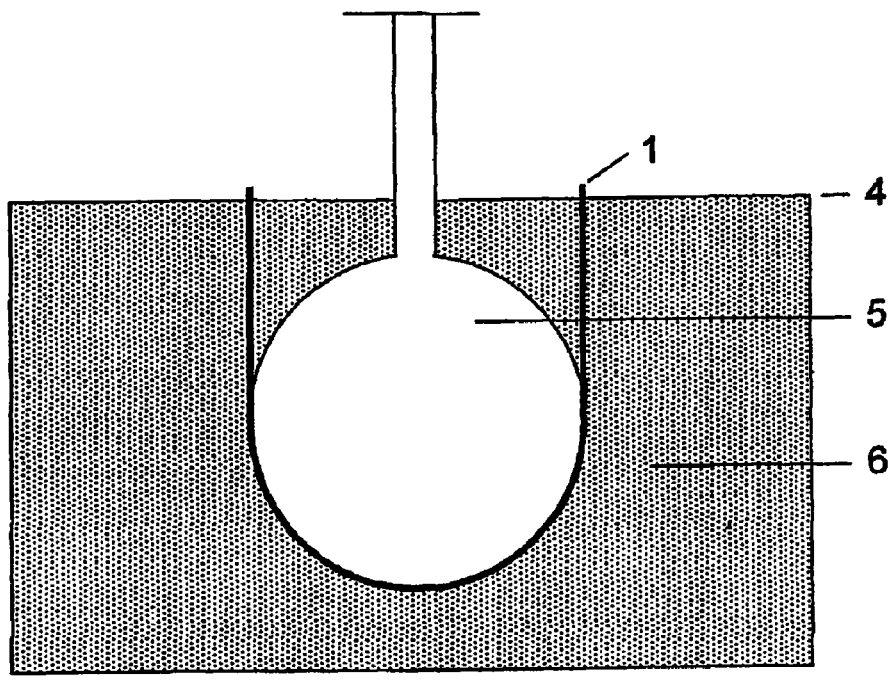

For the aeration of tree roots (FIG. 2) in a municipal context, an embodiment of the soil wick 1 of extremely large dimensions may be employed. For example, a needled web (950 g/m$^2$) or a web combination, cut to 5 cm wide, 8 mm thick and 2.5 m long, extending from the soil surface 4 down to the root region between root conglomerates 5 and the soil 6. In contrast to DE 36 00 340 A, it may also be passed continuously below the root conglomerate 5 (or even directly in between the roots of the root conglomerate 5) and upwards again to the soil surface 4 on the opposite side, to project even higher upwardly and thus also acting additionally as a kind of carrier strap (e.g. consisting of a high tensile combination of a plastics fibre needle web with additional tensile fibres of polyester, glass, wire, cotton or hemp) for lifting and placing the tree. Furthermore, by the net-shaped introduction of additional soil wicks 1 in the form of non-woven fabric strips which contact each other in point-like fashion, it is possible in a simple manner to provide a three-dimensional distribution structure around the entire root conglomerate 5. When using a soil wick 1 in the form of a resilient non-woven fabric, a pumping action in the core of the fabric and thereby an active air- and water distribution, may be brought about even by vibration (in the case of roads etc).

Figure 3:
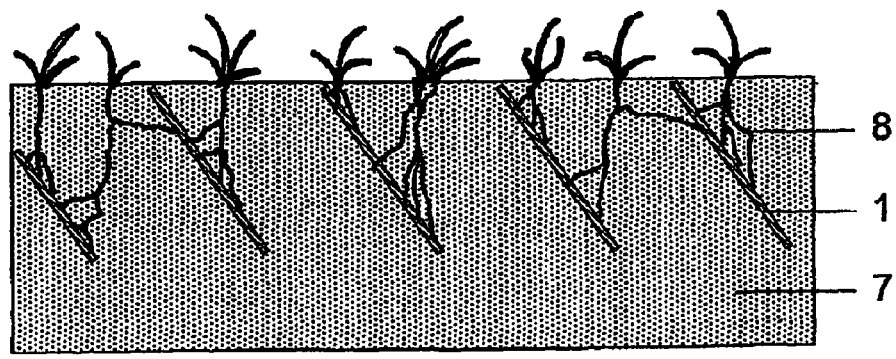
Figure 4:
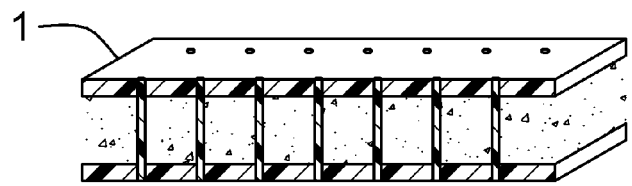
FIG. 4 is a cut-away view of a single soil wick of the present invention.

A non-woven fabric combination according to FIG. 3 is produced by needle-bonding a 180 g/m$^2$ needled fabric of polypropylene and a 300 g/m$^2$ geo textile needled fabric of polypropylene (thickness 2 or 3 mm, pore open widths 0.1 or 0.08 mm). Between the two outermost fabric layers, a mixture of grass seeds, charcoal and fertiliser is introduced and jointly needle-bonded in. Subsequently, the approximately 6 mm thick fabric combination is cut by inter-engaging cutting rollers into soil wicks 1 in the form of strips of 10×180 mm. These soil wicks 1 are very advantageous, e.g. in the case of sandy soils 7 with little or only spare vegetation (desert greening). In this context, they may be used alone or with further insertion substances, such as peat or super absorbers, mixed into the sandy soil 7 or may even be inserted by piercing into the sandy soil 7 obliquely from above (e.g. at 45°).

In this embodiment, the thicker web primarily performs the function of water distribution. Bentonite and charcoal, in combination with the fertiliser, perform water- and nutrient storage functions, whereby the grass seeds are enabled to rapidly germinate through the cutting edges or the thinner web. The roots 8 are immediately well and durably anchored in the soil wicks 1. The web layers, in addition to that of water storage, also have the object to protect bentonite and charcoal in the longer term against being flushed out. The charcoal may, even beforehand, be inoculated with micro organisms (Terra Preta, e.g. EP 1 739 067 A). Alternatively, the complete combination, prior or after cutting, may also be inoculated with micro organisms.

Figure 5:
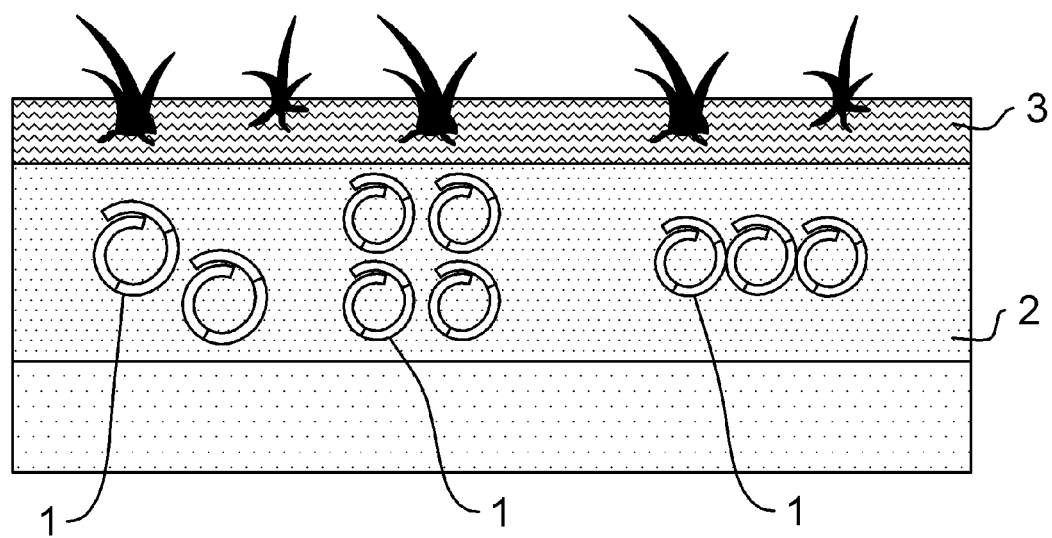
FIG. 5 is an application example using rings of interconnected soil wicks.
Figure 6:
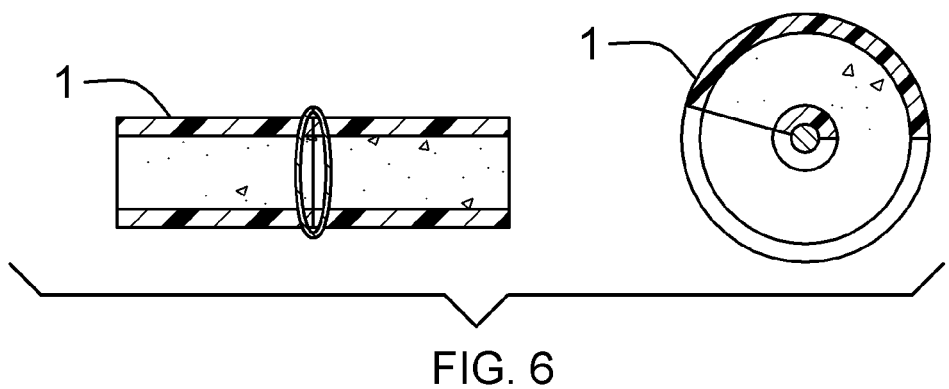
FIG. 6 is a cross-section view of the soil wicks sewn together with a wire and wound around a wire.
Figure 7:
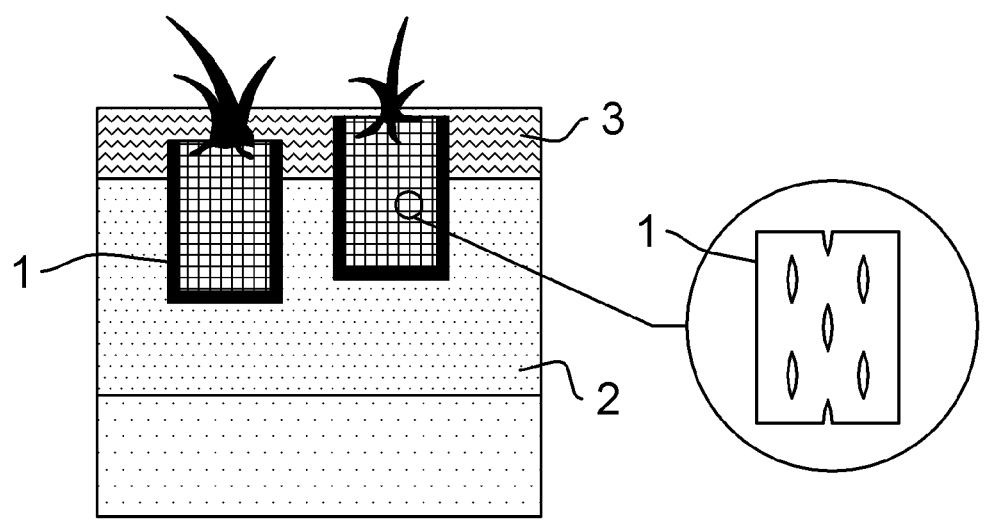
FIG. 7 is an application example of the soil wicks connected to form a net in a sack configuration.

In FIG. 5 there is shown how, under a rolled turf 3 still to be installed a substrate 2 of soil material, fertilizer and soil wicks 1 in the form of strips of non-woven fabric interconnected with one another to form rings. The ring shaped soil wicks 1 are at least one of partly slotted, parallel, and interconnected point-wise.

Further applications for this embodiment of soil wicks also arise, e.g. at steep embankments with nutrient-rich soils, if the intention is for the grass to become settled rapidly in order to avoid erosion and land slides. In that context, the strips may advantageously also be elected of somewhat greater lengths in order to increase the root work internetting and the thinner non-woven or textile may be composed of degradable natural fibres.

To summarise an example of the embodiment of the invention may be described as follows:

A vegetation and support layer contains a mixture of natural soil materials and soil wicks. The soil wicks are composed of a water and air conductive material in the form of an elongate braiding. In this manner the result is attained that the soil wicks conduct water and air in the vegetation and support layer. The vegetation and support layer according to the invention provides that the soil wicks are intermixed in the soil material randomly, in net-like manner, or are introduced from above, the soil wicks being preferably arranged at a distance from a lower-lying water-filled vessel or a ground water-bearing formation, such that the soil wicks do not extend into lower-lying water layers.

The invention claimed is:

1. A vegetation and support layer for providing in a soil layer an improved water and air distribution and a water consumption regulating effect, said vegetation and support layer comprising:
    a soil material; and
    soil wicks for the distribution of water and air, said soil wicks are composed of a material which conducts both water and air, said soil wicks are mixed in said soil material to form a mixture of said soil wicks and said soil material, said soil wicks are arranged at a distance from at least one of a lower lying water-filled vessel, and a ground water-bearing formation;
    wherein each of said soil wicks has at least two layers needle-bonded together with a layer of additive between said layers;
    wherein said mixture is in the form of at least one of an elongate filament braiding, and geotextile strips;

wherein said soil wicks are mixed with said soil material, said soil wicks being of at least one form selected from the group consisting of single soil wicks, a net of connected soil wicks, and rings of interconnected soil wicks.

2. The vegetation and support layer according to claim 1, wherein said soil wicks are composed from at least one material selected from the group consisting of glass fibers, mineral fibers, cotton fibers, coconut fibers, hemp fibers, plastics fibers, mineral wool, and geotextile strips.

3. The vegetation and support layer according to claim 2, wherein said soil wicks are sprayed with at least one substance for improving properties of said vegetation and support layer.

4. The vegetation and support layer according to claim 2, wherein said soil wicks further comprise at least one of a geotextile, textile, foil, non-woven fabric, and a combination thereof, which are inter-connected over an entire surface area or in parts of said soil wicks.

5. The vegetation and support layer according to claim 1, wherein said additive is selected from the group consisting of bentonite, zeolite, ion exchangers, peat, straw, super absorbers, wetting agents, active carbon, latent heat storage substances, fertilizers, plant seeds, algae, yeasts, bacteria, fungi/spores, wood, straw, plant residues, plastics, geotextiles, rubber granulate, synthetic lawn, ceramics chips, porous stones, sand, expanded clay, seeds, charcoal, optionally charcoal inoculated with microorganisms, adsorbent materials, absorbent materials, odor-neutralizing substances, copper, microorganisms, sand, tensile filaments, supporting wires, small tubes, water storing materials, and mixtures thereof.

6. The vegetation and support layer according to claim 1, wherein said soil material part of said mixture contains admixed therein at least one additive selected from the group consisting of bentonite, zeolite, ion exchangers, peat, straw, super absorbers, charcoal or active carbon, latent heat storage substances, fertilizers, plant seeds, algae, yeasts, bacteria, fungi/spores, wood, straw, plant residues, plastics, geo textiles, rubber granulate, synthetic lawn fibers, ceramics chips, porous stones, sand, and expanded clay.

7. The vegetation and support layer according to claim 1, wherein said soil wicks are sewn together with a wire or wound around a wire to form rigidized soil wicks, said soil wicks are interconnected to form a three dimensional net structure configured to increase a shearing strength of said vegetation and said soil material.

8. The vegetation and support layer according to claim 1, wherein said soil wick net has a sack shape and is configured to retain root conglomerates or to form around root conglomerates an air- and water-distributing net structure.

9. A method for manufacturing a vegetation and support layer, said method comprising the steps of:
a) inserting soil wicks into a soil material from above, each of said soil wicks having at least two layers needle-bonded together with a layer of additive between said layers; and
c) wherein said layer of additive is selected from the group consisting of sand, fertilizer, latent heat storage means, zeolite, charcoal, and super absorber;
wherein said soil wicks are of at least one form selected from the group consisting of single soil wicks, a net of connected soil wicks, and rings of interconnected soil wicks.

10. The method according to claim 9, wherein said soil wicks are introduced by inserting, at least in part, from above into an existing soil layer, through at least one layer adjacent said existing soil layer, said layer being selected from the group consisting of rolling lawns, geo textiles, drainage means, foils, and wire networks at an angle.

11. The method according to claim 9, wherein said soil wicks are introduced by piercing said soil wick at least one of a prong or a hollow spoon, wherein said soil wicks area repeatedly pierced from above into said layer, and as a long strap laid into slits and pulled upwards at point localities.

12. The method according to claim 10 further comprising the steps of:
providing said soil wicks for aeration of tree roots, wherein said soil wicks are introduced from a soil surface down to a root region, said soil wicks performing the function of a carrying and installation aid; and
positioning said soil wicks around a root conglomerate in the form of a net structure.

13. The method according to claim 10 further comprising the steps of:
providing said soil wicks for venting of coffins, wherein said soil wicks are conducted from a soil surface to said coffin, said soil wicks performing the function of a carrying and installation aid; and
combining an odor-binding or deodorant substance with said soil wicks.

14. The method according to claim 10, wherein said soil wicks are introduced individually in a net structure into said soil layer.

15. The method according to claim 14 further comprising the steps of:
changing parts of said net structure by at least one action of upward-pulling, pressing-in, and hammering-in; and
fixing parts of said net structure by at least one fastening means selected from the group consisting of soil anchors, earth pegs, and soil wicks.

16. The method according to claim 15 further comprising the steps of:
combining at least one additional material with said soil wicks by at least one means of needle bonding, sewing together, adhesive bonding, and welding, wherein said additional material is selected form the group consisting of geotextiles, non-woven fabric layers, non-woven fabrics with textiles, and non-woven fabrics with foils; and
wherein said layer of additive is selected from the group consisting of seeds, charcoal, charcoal inoculated with micro organisms, bentonite, zeolithe, absorbing materials, odor neutralizers, latent heat storage substances, fertilizers, spores, algae, micro organisms, straw, sand, tensile filaments, supporting wires, small tubes, water storing materials, and combinations thereof.

17. The method according to claim 16 further comprising the steps of:
deforming said additional material in a deep-drawing process;
connecting said additional material by at least one of over a surface area, point-wise, and along edges thereof; and
cutting said additional material to form at least one of elongate strips, and nets.

18. The method according to claim 10, wherein said soil wicks are introduced by at least one of drilling screwing, by means of at least one of a slitting knife, hydro jet, aerification machine, and manually produced apertures from above.

* * * * *